US012675913B2

(12) United States Patent
Thong et al.

(10) Patent No.: US 12,675,913 B2
(45) Date of Patent: Jul. 7, 2026

(54) SYSTEMS AND METHODS FOR DETERMINING AND USING A MULTIDIMENSIONAL MEASURE OF APPARENT SKIN COLOR

(71) Applicant: Sony Group Corporation, Tokyo (JP)

(72) Inventors: William Eric Thong, Zurich (CH); Przemyslaw Kamil Joniak, Tokyo (JP); Alice Xiang, Seattle, WA (US)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 18/333,729

(22) Filed: Jun. 13, 2023

(65) Prior Publication Data

US 2023/0419549 A1     Dec. 28, 2023

Related U.S. Application Data

(60) Provisional application No. 63/366,981, filed on Jun. 24, 2022.

(51) Int. Cl.
G06T 7/90 (2017.01)
G06T 7/11 (2017.01)
(Continued)

(52) U.S. Cl.
CPC .................. G06T 7/90 (2017.01); G06T 7/11 (2017.01); G06V 10/50 (2022.01); G06V 10/762 (2022.01);
(Continued)

(58) Field of Classification Search
CPC ... G06T 7/90; G06T 7/11; G06T 2207/20081; G06T 2207/20132; G06T 2207/30201;
(Continued)

(56) References Cited

U.S. PATENT DOCUMENTS

| 8,452,778 B1 * | 5/2013 | Song | .................... | G06F 16/7844 |
| | | | | 707/748 |
| 2006/0269111 A1 * | 11/2006 | Stoecker | ................ | G16H 30/40 |
| | | | | 382/128 |

(Continued)

FOREIGN PATENT DOCUMENTS

| CN | 102324020 A | 1/2012 |
| JP | 2022047872 A | 3/2022 |

OTHER PUBLICATIONS

Linh Viet Tran, Reiner Lenz, "Characterization of color distributions with histograms and kernel density estimators," Proc. SPIE 5018, Internet Imaging IV, (Jan. 10, 2003); https://doi.org/10.1117/12.473588 (Year: 2003).*

(Continued)

*Primary Examiner* — Wesley J Tucker
(74) *Attorney, Agent, or Firm* — INNOVATION CAPITAL LAW GROUP, LLP; Vic Lin

(57)     ABSTRACT

Systems and methods can compute a multidimensional score of apparent skin color to capture skin color variation and provide a comprehensive representation of its constitutive complexity. The multidimensional apparent skin color score can be used to reveal biases related to skin color in image datasets and computer vision models. The multidimensional skin color score can focus on the perceptual lightless, L*, as a measure of skin tone ranging from light to dark, and the hue angle h*, as a measure of skin hue ranging from red to yellow. The multidimensional skin color scale offers a more representative assessment to surface socially relevant biases due to skin color effects in computer vision. This could help to (i) enhance the diversity in the data collection process, by encouraging specifications to better represent skin color variability; and (ii) improve the identification of dataset and (Continued)

model biases in fairness benchmarking, by highlighting their limitations.

18 Claims, 4 Drawing Sheets

(51) Int. Cl.
  *G06V 10/50*          (2022.01)
  *G06V 10/762*         (2022.01)
  *G06V 40/16*          (2022.01)

(52) U.S. Cl.
  CPC .......... *G06V 40/171* (2022.01); *G06V 40/172* (2022.01); *G06T 2207/20081* (2013.01); *G06T 2207/20132* (2013.01); *G06T 2207/30201* (2013.01)

(58) Field of Classification Search
  CPC ........... G06T 2207/10024; G06T 2207/20084; G06V 10/50; G06V 10/762; G06V 40/171; G06V 40/172; G06V 40/162
  See application file for complete search history.

(56) References Cited

U.S. PATENT DOCUMENTS

| | | | | |
|---|---|---|---|---|
| 2007/0046788 A1* | 3/2007 | Harada | ...................... | G06T 5/92 |
| | | | | 348/E5.076 |
| 2008/0187235 A1* | 8/2008 | Wakazono | ............. | H04N 23/76 |
| | | | | 348/E5.091 |
| 2010/0226572 A1* | 9/2010 | Adachi | ..................... | G09G 5/06 |
| | | | | 382/167 |
| 2011/0090362 A1* | 4/2011 | Yanagita | ................ | H04N 23/86 |
| | | | | 348/222.1 |
| 2011/0216967 A1* | 9/2011 | Hagiwara | .............. | H04N 1/628 |
| | | | | 382/162 |
| 2015/0363945 A1* | 12/2015 | Atsmon | ................. | G06Q 10/00 |
| | | | | 382/162 |
| 2016/0065864 A1* | 3/2016 | Guissin | ..................... | G06T 5/20 |
| | | | | 348/239 |
| 2019/0014884 A1* | 1/2019 | Fu | .......................... | G06T 1/0007 |
| 2019/0108628 A1* | 4/2019 | Sato | ........................... | G06T 5/50 |
| 2019/0310193 A1* | 10/2019 | Scardina | ................... | G01J 3/10 |
| 2024/0065554 A1* | 2/2024 | Serval | .................... | G06V 20/20 |

OTHER PUBLICATIONS

Saluena et al., "CIELAB color paths during meat shelf life", Meat Science, vol. 157, Nov. 2019.

* cited by examiner

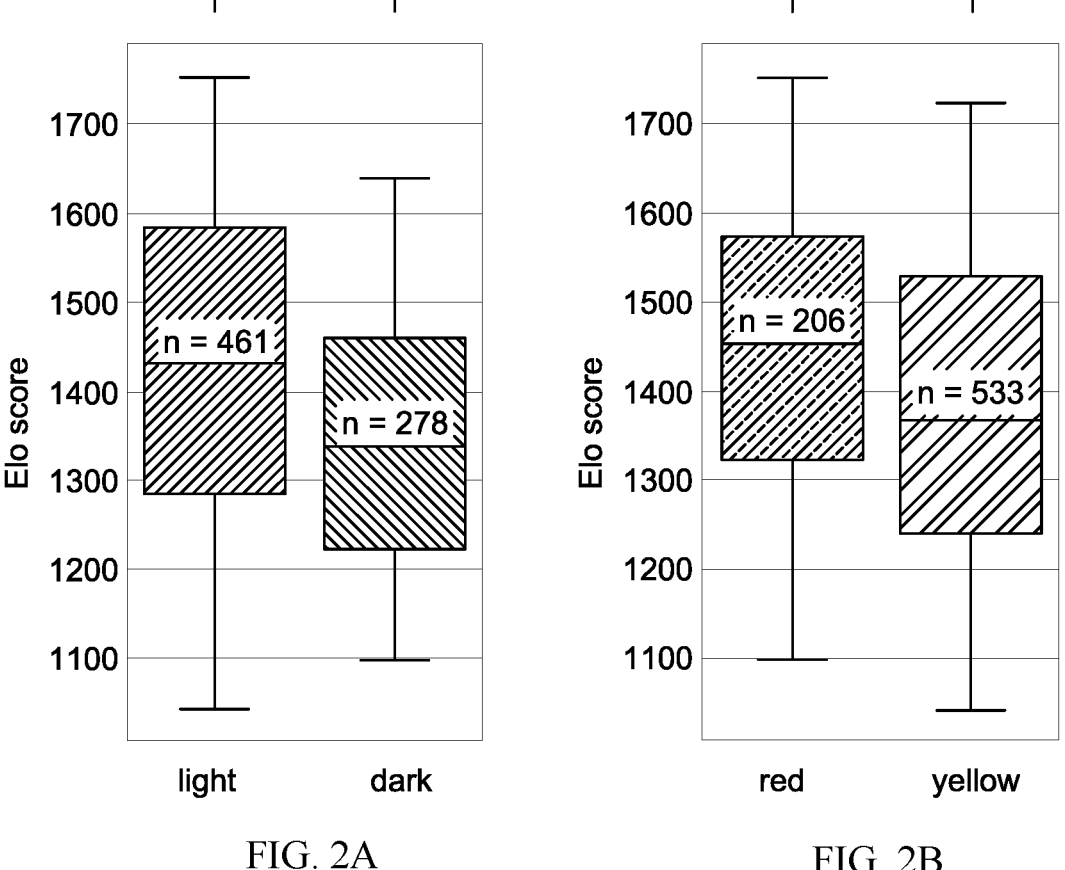
FIG. 2A                    FIG. 2B

| Model | Skin tone | | | | | | | | | Skin hue | | | | | |
| | Reconstructed | | | +light | | | +dark | | | +red | | | +yellow | | |
| | F | M | All | F | M | All | F | M | All | F | M | All | F | M | All |
|---|---|---|---|---|---|---|---|---|---|---|---|---|---|---|---|
| AWS | 99.67 | 94.82 | 97.88 | 99.84 | 90.66 | 96.45 | 98.84 | 97.73 | 98.27 | 99.69 | 94.88 | 97.92 | 99.63 | 94.56 | 97.76 |
| Azure | 99.78 | 95.80 | 98.31 | 99.91 | 92.59 | 97.22 | 99.11 | 97.72 | 98.60 | 99.75 | 96.01 | 98.37 | 99.78 | 95.45 | 98.18 |
| Clarifai | 95.31 | 85.94 | 91.85 | 96.04 | 80.14 | 90.18 | 93.04 | 92.20 | 92.73 | 94.72 | 86.52 | 91.70 | 96.02 | 84.53 | 91.79 |
| FairFace | 99.49 | 92.91 | 97.06 | 99.77 | 87.56 | 95.27 | 98.21 | 96.57 | 97.61 | 99.52 | 93.10 | 96.97 | 99.42 | 92.77 | 97.16 |

FIG. 3

| Model | Skin tone | | | | | | | | | Skin hue | | | | | |
| | Reconstructed | | | +light | | | +dark | | | +red | | | +yellow | | |
| | S | NS | All | S | NS | All | S | NS | All | S | NS | All | S | NS | All |
|---|---|---|---|---|---|---|---|---|---|---|---|---|---|---|---|
| AWS | 92.80 | 93.66 | 93.26 | 94.22 | 91.58 | 92.82 | 88.80 | 96.02 | 92.63 | 96.88 | 86.38 | 91.32 | 87.97 | 96.70 | 92.60 |
| Azure | 97.29 | 80.84 | 88.57 | 98.13 | 76.36 | 86.60 | 95.59 | 86.11 | 90.57 | 99.00 | 69.76 | 83.51 | 95.18 | 87.22 | 90.97 |

SYSTEMS AND METHODS FOR DETERMINING AND USING A MULTIDIMENSIONAL MEASURE OF APPARENT SKIN COLOR

CROSS-REFERENCE TO RELATED APPLICATIONS

This application claims the benefit of priority of U.S. provisional patent application 63/366,981, filed Jun. 24, 2022, the contents of which are herein incorporated by reference.

BACKGROUND OF THE INVENTION

1. Field of the Invention

Embodiments of the invention relate generally to apparent skin color determination. More particularly, embodiments of the invention relate to methods and systems for determining and using a multidimensional measure of apparent skin color to identify bias in datasets and machine learning models.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

For fairness benchmarking, there is often a need to measure the skin color in images. Adverse decisions can arise in common computer vision models. This has an impact on real-life applications, as models can produce wrong skin lesion diagnostics or incorrect heart rate measurements for individuals with darker skin tones. It is therefore critical to identify to what extent datasets or computer vision models are affected by changes in skin color.

The commonly accepted standard for skin color scale is the Fitzpatrick skin type classification, which categorizes skin color into six different types based on skin tone, ranging from light to dark. It has unsurprisingly become a useful tool for fairness analysis because skin tone annotations may serve as a proxy for race or ethnicity annotations.

In recent years, there has been growing awareness of the potential for computer vision models to be biased against under-represented groups. It is thus critical to develop fairness tools that can help assess potential biases and document them in datasheets and model cards.

In view of the foregoing, there is a need for methods and systems to address these limitations of existing skin color determination its use.

SUMMARY OF THE INVENTION

To address these limitations of existing skin color determination methods, aspects of the present invention provide a multidimensional apparent skin color score that can be used to determine bias and fairness in datasets and models.

Embodiments of the present invention provide a computer-implemented method for determining an apparent skin color of a face image comprising receiving an input image; segmenting skin pixels in the input image; extracting a perceptual lightness, L*, value, a green-red opponent color value, a*, and a blue-yellow opponent color value in each segmented skin pixel; applying a clustering algorithm to cluster the segmented skin pixels; computing a histogram of a distribution obtained from the clustering algorithm; and assigning a scalar value for L* and for a hue angle, h*, based on the mode of the histogram, for each cluster.

Embodiments of the present invention provide a computer-implemented method for determining bias in a face image dataset comprising determining an apparent skin color of each face image in the face image dataset by receiving an input image having the face image, segmenting skin pixels in the input image, extracting a perceptual lightness, L*, value, a green-red opponent color value, a*, and a blue-yellow opponent color value in each segmented skin pixel, applying a clustering algorithm to cluster the segmented skin pixels, computing a histogram of a distribution obtained from the clustering algorithm, assigning a scalar value for L* and for a hue angle, h*, based on a mode of the histogram, for each cluster, and determining a final scalar score for the input image by averaging the scalar values of each cluster, normalized by a pixel size of each cluster; determining the bias in the face image dataset with respect to light and dark skin tones by calculating a number of face images having the L* scalar value greater than and less than a first predetermined threshold; and determining the bias in the face image dataset with respect to skin hue by calculating a number of face images having the h* scalar value greater than and less than a second predetermined threshold.

Embodiments of the present invention provide a computer-implemented method for determining bias in a computer vision-based model comprising determining an apparent skin color of each face image in the face image dataset by receiving an input image having the face image, segmenting skin pixels in the input image, extracting a perceptual lightness, L*, value, a green-red opponent color value, a*, and a blue-yellow opponent color value in each segmented skin pixel, applying a clustering algorithm to cluster the segmented skin pixels, computing a histogram of a distribution obtained from the clustering algorithm, assigning a scalar value for L* and for a hue angle, h*, based on the mode of the histogram, for each cluster, and determining a final scalar score for the input image by averaging the scalar values of each cluster, normalized by a pixel size of each cluster; using the face image dataset in a machine learning model; and determining whether an output of the machine learning model includes a bias based on at least one of the perceptual lightness value or the hue angle value.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 2A illustrates performance differences, with saliency-based image cropping, between light and dark skin tones;

FIG. 2B illustrates performance differences, with saliency-based image cropping, between red and yellow skin hues;

FIG. 3 illustrates attribute prediction on a common face dataset, where, in gender classification, models classify individuals as more feminine when their skin tone becomes lighter; and FIG. 4 illustrates attribute prediction on a common face dataset, where, in smile classification, models classify individuals as smiling when their skin tone becomes lighter or when their skin hue becomes redder.

Figure 1A:
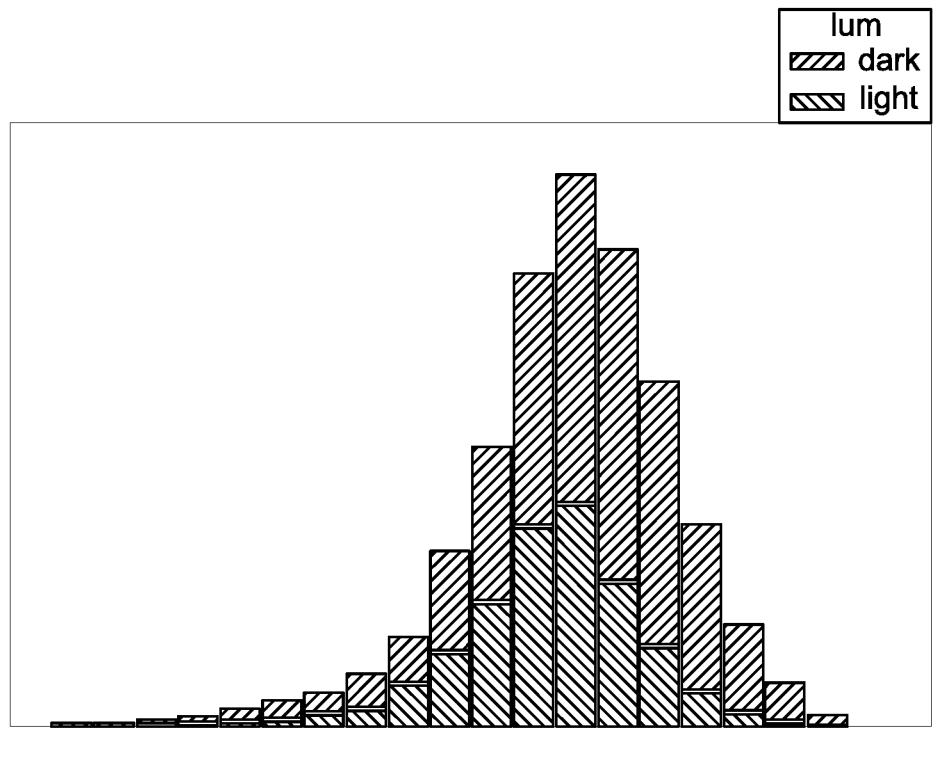
FIG. 1A illustrates a histogram on a common face dataset, showing a dominance of light skin tones in the dataset.

Unless otherwise indicated, the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G, and the like.

Embodiments of the present invention may include apparatuses for performing the operations disclosed herein. An apparatus may be specially constructed for the desired purposes, or it may comprise a device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

As is well known to those skilled in the art, many careful considerations and compromises typically must be made when designing for the optimal configuration of a commercial implementation of any method or system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide methods for computing a multidimensional score of apparent skin color to capture skin color variation and provide a comprehensive representation of its constitutive complexity. Once such a multidimensional apparent skin color score is determined, it can be used to reveal biases related to skin color in image datasets and computer vision models, which were previously invisible. The multidimensional skin color score can focus on the perceptual lightless, L*, as a measure of skin tone ranging from light to dark, and the hue angle h*, as a measure of skin hue ranging from red to yellow.

The multidimensional skin color scale offers a more representative assessment to surface socially relevant biases due to skin color effects in computer vision. While the below description focuses on face-related tasks, assessing skin color could also be applied to other human-centric tasks (e.g., pose estimation, segmentation, or the like). This could help to (i) enhance the diversity in the data collection process, by encouraging specifications to better represent skin color variability; and (ii) improve the identification of dataset and model biases in fairness benchmarking, by highlighting their limitations. Therefore, it is recommended to use a multidimensional skin color measure as a fairness tool to assess the computer vision pipeline, from data collection to model deployment.

Aspects of the present invention are focused on characterizing "apparent skin color" rather than true skin color. The apparent skin color is the one depicted in images, and the one that a computer vision model would see, while the true skin color characterizes the constitutive skin color without the influence of external factors such as illumination or color cast. Assessing the true skin color is more important for dermatology or cosmetics applications as the constitutive color leads to more specific diagnostics or treatments and requires an active involvement with practitioners to avoid any misusage or mistrust. In the present invention, the focus is on the assessment of computer vision models which are fed images in the wild and therefore only consider the apparent skin color.

As discussed in greater detail below, aspects of the present invention demonstrate the relevance and benefits of a multidimensional skin color scale for fairness benchmarking in computer vision. Some embodiments provide a step towards more comprehensive apparent skin color scores. Rather than classifying skin color in types, as done with the Fitzpatrick scale, aspects of the present invention can measure automatically and quantitatively skin color in a multidimensional manner in images. For example, embodiments of the present invention can focus on the perceptual light L*, as a measure of skin tone, and the hue angle h*, as a measure of skin hue, which results in a multidimensional measure for every image. Embodiments of the present invention further describe uses of this multidimensional measurement of skin color by (i) quantifying to what extent common image datasets are skewed towards light-red skin color and underrepresent dark-yellow skin color, and how generative models trained on these datasets reproduce a similar bias; (ii) revealing multidimensional skin color biases in saliency-based image cropping and face verification models; and (iii) measuring the causal effect of skin color in attribute prediction in multiple commercial and non-commercial models. Overall, aspects of the present invention, describing contributions to assessing skin color in a multidimensional manner, offer novel insights, previously invisible, to better understand biases in fairness benchmarking for both datasets and models.

Multi-Dimensional Skin Color Scores

Given the limitations of conventional skin color scales, such as the Fitzpatrick scale, in their definition or annotation process, deriving quantitative metrics can enable more reliable skin color scores. Instead of asking a subject for a self-identification of the skin color type or collecting the skin color type from an annotator, it is desirable to compute a skin color score from a point measurement. Indeed, this mitigates the subjectivity of the (self-)annotator as well as the inter-rater reliability.

Colorimetry aims to represent faithfully the human perception of colors. Towards this goal, the Commission Internationale de l'Eclairage (CIE) establishes standards regarding illuminants, tristimulus values, or color spaces. While images are usually represented in the standard RGB space, it might be more relevant to represent them in a color space that better reflects the human perception when assessing skin color variation.

Aspects of the present invention explore the CIE L*a*b* (CIELAB) color space, which correlates with the response of the human eye by covering its entire range of color perception, where the L* component corresponds to the perceptual lightness and ranges from black at value 0 to white at value 100; the a* component describes the green-red opponent colors, with negative values corresponding to green and positive values to red; and the b* component refers to the blue-yellow opponent colors, with negative values corresponding to blue and positive values to yellow.

Individual typology angle (ITA) provides a quantitative alternative to the Fitzpatrick scale. The individual typology angle is commonly used to describe the skin color on spectrophotometer measurements for aesthetic cosmetology or clinical dermatology. In fairness analyses, it has notably been applied to natural images of faces images, and skin analysis. Concretely, the individual typology angle is defined in the CIELAB color space as follows:

$$ITA = \arctan((L^*-50)/b^*) \times (180/\pi) \qquad (1)$$

where a perceptual lightness at value 50 corresponds to a maximum chroma. Only the L* and b* components are selected as they are the ones that explain best the variation of the suntanning pathways of the skin.

Despite its advantages of providing a quantitative measure, the individual typology angle is not a comprehensive skin color score. It was originally developed for the suntanning pathways of white skins, similar to the Fitzpatrick scale. While there exists a mapping between angles and Fitzpatrick skin color types (e.g., values above 28° correspond to light skin tones, type I to III; and dark skin tones, type IV to VI otherwise), the low correlation with expert annotations makes it less reliable. Given these limitations, there is a need to provide a more comprehensive assessment of skin color.

Hue angle provides a colorimetric measure to describe the perceived gradation of color. In the CIELAB color space, the hue angle is defined as follows:

$$h^* = \arctan(b^*/a^*) \qquad (2)$$

where h* goes from 0 to 360° as a* and b* components are unbounded. That said, typical interest lies in angles between 0 and 90° (i.e., positive values of a* and b*), as the skin color is expressed through red and yellow colors.

The hue angle has proven to be suitable as an additional dimension to design proprietary skin color scales for aesthetics cosmetology. While these other fields have been exploring a multidimensional measure for skin color, fairness benchmarks in computer vision have mainly focused on a unidimensional measure of skin tone. Aspects of the present invention propose to consider both the skin tone and the skin hue as a multidimensional measure for skin color analysis in images. The hue angle does not appear to have been used for fairness analysis in computer vision. Aspects of the present invention focus on the measurement of L* for skin tone and h* for skin hue. Measuring L* instead of ITA avoids having correlated measures as both ITA and h* contain the b* component.

Skin Color Multidimensional Measurement

Skin color scores provide a quantitative measure to characterize the appearance of the skin in an image. Extracting such measures helps to identify potential biases towards skin color subgroups in model performance. An objective of the present invention differs from the cosmetics or dermatology fields, which requires an accurate assessment of constitutive skin color from cutaneous measurements. Aspects of the present invention focus, instead, on the "apparent" skin color in images acquired from any camera, with varying acquisition parameters or lighting conditions.

One challenge resides in extracting skin color scores from skin pixels in an image. Aspects of the present invention provide a framework that starts from a facial image x and outputs a final scalar scoring value y or a set of scalar scoring values $y = \{y^1, \ldots, y^v\}$.

Method. To extract skin color scores from a facial image, the below describes exemplary steps to extract a skin color score in human-centric images: (a) an input image of a subject is provided; (b) the skin pixels are segmenting. Segmentation can be done manually by an annotator or predicted by a skin segmentation model; (c) once skin pixels have been identified, they can be converted from the standard RGB space to the target space of the desired scoring values. Aspects of the present invention convert to the CIELAB space to extract the L* component, and further use the a* and b* components to compute the hue angle h*. This results in a point measurement of L* and h* for every skin pixel in the image; and (d) a clustering algorithm is applied, such as KMeans, to group the skin pixels. For every cluster, a histogram of distribution can be computed and the number of bins can be set with the Sturges formula. The mode of the histogram is then used to assign a scalar value for each considered skin color score. This results in L* and h* scalar values for every cluster.

To obtain the final scalar scores for the image, embodiments of the present invention can average the scalar values of every group normalized by their pixel size. However, as some parts of the face can skew the results towards darker values (e.g., facial hair or shaded regions), in some embodiments, some groups which yield a very low L* are excluded. The face skin can be clustered into five groups and the top-3 groups with the highest L* are kept to compute the final L* and h* scalar scores for the image.

Embodiments of the present invention can start from an image of a subject and can require a segmentation of facial parts to obtain a skin mask. Such segmentation can be obtained via manual labeling or automatically via a model for skin segmentation. Embodiments of the present invention, in step (c), can consider any skin color score and not only the individual typology angle. Further, in step (d), the need for facial landmarks is removed by relying on skin pixel clustering. This better deals with atypical facial poses, as clustering can handle faces that are unaligned or from the side (i.e., without visible landmarks). Moreover, clustering can identify shaded areas of the face or facial hair, which can be removed to avoid contaminating the final skin color scores.

Skin Color Bias in Datasets

Skin color scores enable the assessment of potential biases in a given image dataset. By extracting them for every sample in the dataset, it is possible to estimate the distribution of every subgroup and characterize how unbalanced the distribution might be. Embodiments of the present invention focus on the CelebAMask-HQ dataset, which is composed of 30,000 images and is available with a noncommercial research agreement, and FFHQ-Ageing, which is composed of 70,000 images and is available with a Creative Commons BY-NC-SA 4.0 license. Both datasets provide ground truth segmentation masks of the skin, which can be used to extract skin color scores. It should be noted that both datasets are derivative datasets from CelebA and FFHQ, respectively, with images crawled from social media platforms.

In these datasets, when lightness $L^*$ is over a value of 60, it corresponds to a light skin tone (and conversely for a dark skin tone). When hue angle $h^*$ is over 55°, it corresponds to a skin turning towards yellow (and conversely for a skin turning towards red). These threshold values were taken from literature references.

Tables 1 and 2, below, provides a quantitative assessment of the skin tone and the skin hue. Both datasets are skewed towards light skins. Aspects of the present invention enable one to quantify such skin color bias. Measuring the hue angle further shows that both datasets are also skewed towards red skins.

TABLE 1

|  |  | CelebAMask-HQ | | |
|  |  | Skin Tone | | |
|  |  | Light | Dark | Total |
| Hue | Red | 46.95 | 19.28 | 66.23 |
|  | Yellow | 27.48 | 6.29 | 33.77 |
|  | Total | 74.43 | 25.57 | 100 |

TABLE 2

|  |  | FFHQ | | |
|  |  | Skin Tone | | |
|  |  | Light | Dark | Total |
| Hue | Red | 52.82 | 29.06 | 81.87 |
|  | Yellow | 13.44 | 4.68 | 18.12 |
|  | Total | 66.26 | 33.74 | 100 |

Additionally, the skin color bias on the output of generative models trained on FFHQ was measured. To achieve this, 10,000 images were generated with a generative adversarial network (StyleGAN3) and a diffusion model (P2).

Tables 3 and 4, below, show that both StyleGAN3 and P2 are reproducing the skin color bias present in the FFHQ dataset, with P2 slightly amplifying the bias over the original dataset distribution. In future dataset collections, it is recommended tracking both skin tone and skin hue for skin color scores, such that all subgroups are well balanced, which in turn makes the dataset more diverse.

TABLE 3

|  |  | GAN - StyleGAN3 | | |
|  |  | Skin Tone | | |
|  |  | Light | Dark | Total |
| Hue | Red | 53.05 | 28.71 | 81.76 |
|  | Yellow | 13.46 | 4.78 | 18.24 |
|  | Total | 66.51 | 33.49 | 100 |

TABLE 4

|  |  | Diffusion - P2 | | |
|  |  | Skin Tone | | |
|  |  | Light | Dark | Total |
| Hue | Red | 53.29 | 30.08 | 83.37 |
|  | Yellow | 12.01 | 4.62 | 16.63 |
|  | Total | 65.30 | 34.70 | 100 |

Figure 1B:
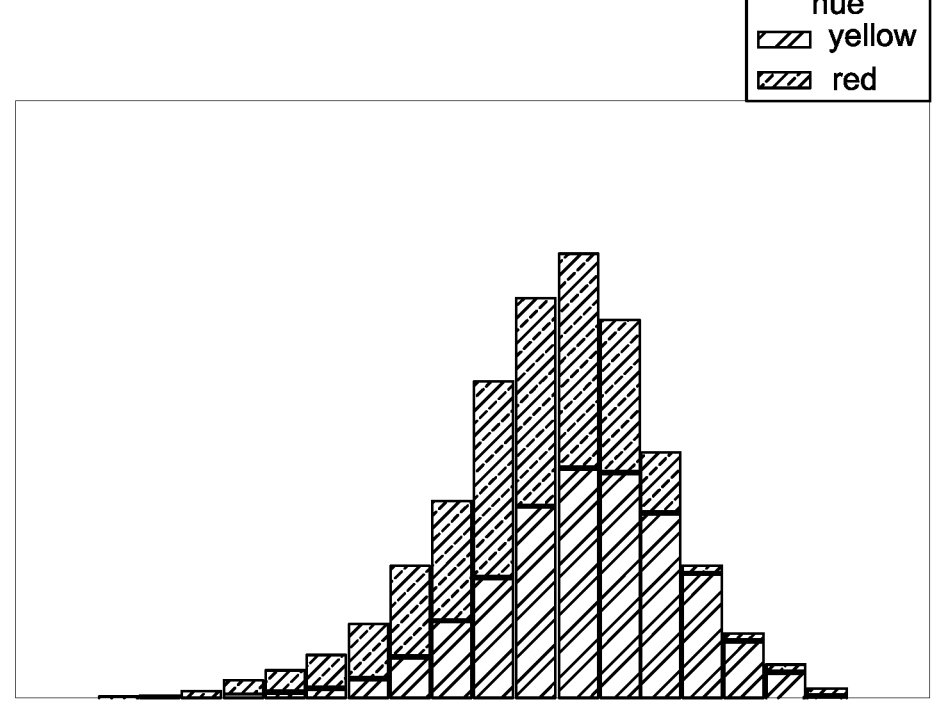
FIG. 1B illustrates a histogram on a common face dataset, showing a dominance of red skin hues.

FIGS. 1A and 1B offer an alternative representation to highlight the skewed skin color distribution in common face datasets. Instead of a binary thresholding for both perceptual lightness $L^*$ and hue angle $h^*$, histograms were plotted of both scores with 20 bins. In both CelebAMask-HQ and FFHQ, distributions are unimodal with a bell curve shape. Individuals with a light skin tone and a red skin hue are over-represented with a much larger count. When considering the skin tone and varying the hue angle thresholding, it was observed that the hue angle has a lower spread for dark skin tones than light skin tones. Conversely, when considering the skin hue and varying the perceptual lightness thresholding, the yellow skin hue tends to have a larger skewness towards light skin tones than the red skin hue. These representations confirm the relevance of a multidimensional measure for skin color, which could help increase the diversity when collecting a humancentric dataset.

Skin Color Bias in Models

Saliency-based image cropping. The saliency-based image cropping task produces a thumbnail based on a saliency map. Such cropping algorithms are notably useful to select which region of a large image to display on a smaller screen. Embodiments of the present invention focus on cropping images with two faces. This setting can then be related to a pairwise comparison where the output decides which face to keep when producing the thumbnail.

Discrimination can happen in case the cropping algorithm favors a specific member of a protected attribute. For example, a method could consistently prefer a facial image of a light-skinned person over a dark-skinned one. In fact, it has been shown that the Twitter® cropping algorithm is prone to gender or skin tone biases, as well as male gaze-like artifacts. Aspects of the present invention focus on assessing the skin color bias on the saliency-based image cropping task.

To build a benchmark for saliency-based image cropping, a quantitative score is proposed to measure the probability of a face to be selected by the cropping algorithm. Given a dataset $$\{x_i, a_i\}_{i=1}^N$$

of N facial images x with their associated race label a. Skin color scales are extracted corresponding to perceptual lightness $y^{L^*}$ and the hue angle $y^{h^*}$ for every facial image. To evaluate the cropping algorithm, images were built to include a unique pair of two facial images $x_i$ and $x_j$ with i≠j.

Aspects of the present invention propose to compute the Elo rating for every facial image. Every pairwise comparison is considered as a game between two facial images $x_i$ and $x_j$. The objective is to get a rating for every facial image, i.e., $R_i$ and $R_j$, which indicates the probability of the face to be selected by the cropping algorithm. The probability for image $x_i$ to be chosen is defined as $p_i = 1/(1+10^{(R_j-R_i)/M})$, where M acts as a temperature for the sigmoid function. Intuitively, if there is a difference of M points between i and j, this means that i has 10 times more chance to be chosen. Conversely, for image $x_j$ there is $p_j = 1-p_i$. The outcome of the cropping algorithm $S_i$ for $x_i$ is equal to 1 if i wins and 0 if j loses, and can be used to update the player score with $R'_i = R_i + K(S_i-p_i)$, and conversely for $x_j$. Following common practice in chess playing, M and K are set to M=400 and K=16 and scores are initialized at 1400.

For benchmarking, the Chicago Face Dataset (CFD) and CFD-India were relied on for a total of 739 unique facial images acquired in a controlled setting available for non-commercial research purposes. The dataset includes a self-reported gender label: 359 females and 380 males; as well as self-reported ethnic labels: 109 Asians, 197 Blacks, 142 Indians, 108 Latinos, 183 Whites. Individuals have given their informed consent for data collection.

The skin masks were extracted with DeepLabV3, trained on CelebAMask-HQ as done in FFHQ-Ageing. From CFD, pairs of facial images were sampled that are equally distributed with respect to gender and ethnicity. The product of both gender and ethnicity label sets results in 10 intersectional groups, forming a total of 45 pairwise combinations. The method sampled 500 pairwise comparisons for each combination, for a total of 22,500. To form the final image, both facial images were concatenated vertically with a white space in between and their aspect ratios were preserved.

Figure 2C:
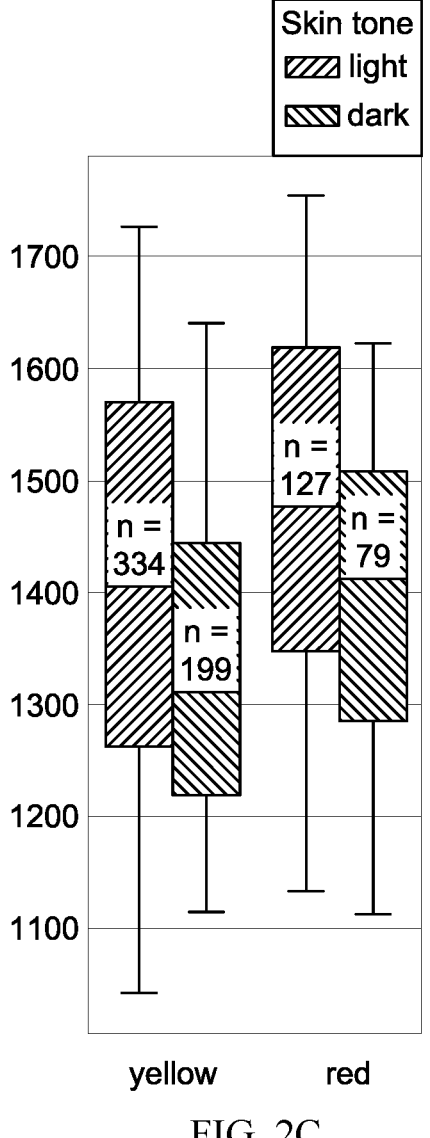
FIGS. 2C and 2D illustrate an intersectional analysis that reveals statistically significant differences, except between light-yellow and dark-red skin colors and, complementary to the skin tone, the skin hue reveals additional differences in performance.
Figure 2D:
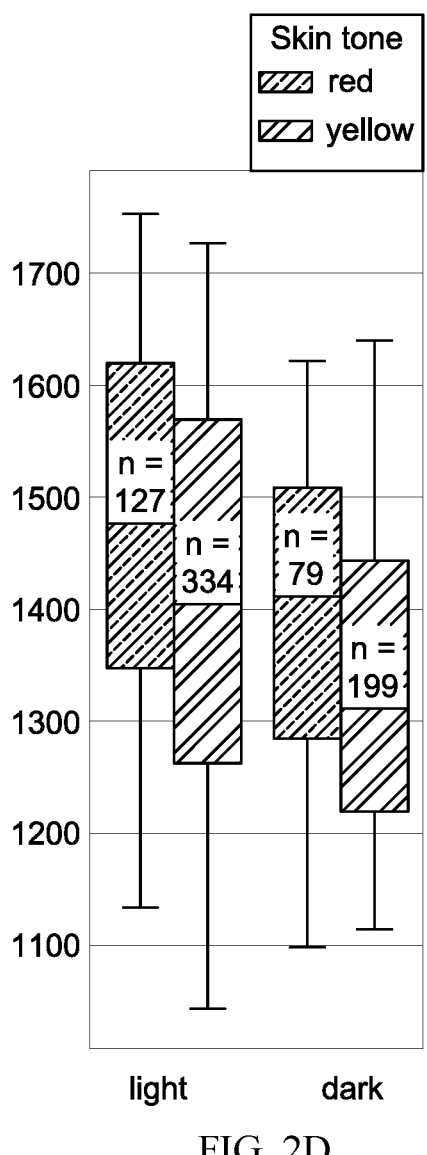

FIGS. 2A through 2D present the results of the saliency-based cropping algorithm of Twitter® on CFD. The Elo score was reported of the 739 individuals after 22,500 pairwise comparisons for image cropping. A high Elo score indicates a preference of the algorithm to select the individual to be kept for cropping. It was found that light skin tones are preferred over dark skin tones (FIG. 2A) with an average Elo score indicating a 60.73% preference, which is confirmed with a statistically significant independent t-test (p<0.0001). The algorithm also prefers red skin hues over yellow ones with an average Elo score indicating a 58.25% preference, which again is statistically significant (FIG. 2B). Intersectional groups of skin tone and hue was also considered (FIGS. 2C and 2D). When performing independent t-tests with a Bonferroni correction, it was found that all pairwise groups are statistically different (p<0.01), except for the light-yellow and dark-red skin colors. Overall, this benchmark reveals a multidimensional hierarchy on the skin color preference of the Twitter® cropping algorithm, with light-red skin colors being favored and dark-yellow skin colors being disfavored.

Face Verification. The face verification task compares a pair of facial images to verify whether they belong to the same individual or not. Noncommercial and publicly available facial recognition models were used. It should be noted that, similar to the previous experiment, embodiments of the present invention focus on exposing potential skin color biases rather than improving the selected face verification models.

A standard benchmark in face verification was adopted, where models are evaluated on their accuracy to predict whether a pair of facial images corresponds to the same individual. This accuracy was evaluated on the Labeled Faces in the Wild (LFW) dataset, which contains 1,000 test pairs (500 positives and 500 negatives). The pre-processed version of LFW available in scikit-learn, and on the Deep-Face repository 1 were relied on to run ArcFace, FaceNet and Dlib face recognition models.

Table 3, below, presents the face verification results of several methods on LFW, broken down by skin tone (light vs. dark) and by skin hue (red vs. yellow). All models tend to prefer light skin tones and red skin hues. Specifically, both ArcFace and Dlib models are affected by skin tone differences, as they better verify the identity of light-skinned individuals. FaceNet has a different behavior, it is more robust to skin tone differences but more prone to skin hue differences.

When looking at intersectional groups, ArcFace and FaceNet perform lower for light and yellow skin colors, as well as dark and red skin colors; Dlib has a decreased performance of dark and yellow skin colors. Overall, this benchmark confirms that in well-established benchmark for face verification, there also exist performance differences in terms of both skin tones and skin hues, which reiterates the importance of a multidimensional measure of skin color.

TABLE 5

| | | | | | | | | | |
|---|---|---|---|---|---|---|---|---|---|
| Face Verification | | | | | | | | | |
| | | Independent Groups | | | | | | | |
| | | | | | Skin Hue | Intersectional Groups | | | |
| | Over- | Skin Tone | | | Yel- | L + | L + | D + | D + |
| Model | all | Light | Dark | Red | low | R | Y | R | Y |
| ArcFace | 95.20 | 95.22 | 94.39 | 95.36 | 95.07 | 96.12 | 94.82 | 92.55 | 96.77 |
| FaceNet | 94.40 | 94.55 | 94.04 | 94.89 | 93.81 | 95.61 | 93.30 | 93.17 | 95.16 |
| Dlib | 94.20 | 94.41 | 93.68 | 94.71 | 94.42 | 94.83 | 93.90 | 94.41 | 92.74 |

Skin color causal effect in models. Given a facial image x, the objective is to predict the presence or absence of an attribute a. Embodiments of the present invention focus on commercial systems, as well as publicly available models, to predict the gender and the presence of a smile.

Empowered with the ability to measure skin color quantitatively, embodiments of the present invention can manipulate an existing dataset by changing its skin tone and skin hue and observing its causal effect on attribute prediction performance. For example, all images in a dataset were modified to have a lighter skin tone and its performance was compared with respect to the original dataset version. Any discrepancy would then correspond to the effect of a bias towards light skin tone in the model.

To build a benchmark for attribute prediction, it was proposed to manipulate images with an image generation method. Specifically, an encoder-decoder scheme was considered, which encodes an image x into a latent vector w, and then decodes w to provide a reconstructed image x̂. Modifying x then includes moving in the latent space towards specific and meaningful directions D, i.e., w+D.

E4e was relied on to encode images and on StyleGAN3 to generate images. Finding directions in the latent space relies on the InterfaceGAN method. Concretely, a classifier is first trained on CelebAMask-HQ to predict the skin tone (light vs. dark) and skin hue (red vs. yellow). Then, 500,000 images were sampled from StyleGAN3, randomly, and the trained classifier was used to infer skin color labels. Two linear SVMs, one for skin tone and one for skin hue, are finally trained on the most confident positive and negative predictions to produce decision boundaries to be used to compute the latent directions D.

For benchmarking, face recognition models of commercial systems were considered, such as AWS Rekognition, Microsoft Azure and Clarifai. Additionally, the publicly available model trained on the FairFace dataset was considered. Aspects of the present invention focus on gender and smile classifications, as both attributes can be predicted with the above systems and come with ground truth labels annotated by a professional company in the CelebA dataset. By performing gender and smile classification, ethical concerns can be highlighted. Such fairness benchmarking promotes model transparency, which in turn creates accountability that could lead to the discontinuation of harmful models. As such, it should be stressed that the gender classification task is not condoned, as it causes harm to non-binary and transgendered individuals by reducing gender to a binary value, but rather report it to examine additional ethical issues around the task.

CelebAMask-HQ was considered for benchmarking. Modifications of the images involve making the skin tone lighter or darker, as well as making the skin hue more red or yellow. It was observed that when skin tone changes, the hue angle stays the same; and conversely when manipulating the hue angle. Modifying the image in one direction does not affect the skin color score in the other direction, making them orthogonal. The same does not hold when selecting the "pale" attribute available in CelebA as a comparison. While the pale direction is effective at manipulating the skin tone, it actually also alters the skin hue. In other words, both L* and h* shift when modifying the pale attribute in the images, which makes such metric impractical for measuring the causal effect of skin color as its effect cannot be controlled. Thus, for benchmarking, all images were modified in the CelebAMask-HQ datasets in both directions of L* and h*, for a total of 4×30,000 images, and the binary accuracy of evaluated models on gender and smile classifications was reported.

FIGS. 3 and 4, present the attribute prediction performance of several methods on CelebAMask-HQ. When measuring the performance on gender classification in FIG. 3, it was observed that manipulating the skin color to have a lighter skin tone decreases the gender classification accuracy while the skin hue does not seem to have a large effect. The skin tone bias occurs because models are prone to classify people as feminine when the tone is lighter. For example, in the gender predictions of AWS for male samples, the accuracy drops from 94.82% to 90.66% while it stays relatively the same for female samples. Interestingly, manipulating the skin to be redder or darker in male sample results in a increase in accuracy for all models. When measuring the performance on smile classification in FIG. 4, it was observed that manipulating the skin color to have a lighter skin tone or a redder skin hue decreases the accuracy in non-smiling individuals as they tend to be predicted as smiling. For example, the accuracy for non-smiling individuals with Azure drops from 80.84% to 69.76% when the skin hue becomes redder while it stays the same for smiling individuals. Conversely, a darker skin tone or a yellower skin hue decreases the accuracy in smiling individuals. Overall, this benchmark reveals a bias towards a light skin tone when predicting if the individual belongs to the female gender, and a bias towards light or red skin hue when predicting the presence of a smile, which illustrates the importance of a multidimensional measure of skin color.

Summary

Measuring apparent skin color requires a multidimensional score to capture its variation and provide a comprehensive representation of its constitutive complexity. The present disclosure first focuses on the perceptual lightness L*, as a measure of skin tone ranging from light to dark, and the hue angle h*, as a measure of skin hue ranging from red to yellow. Aspects of the present invention serve as a simple, yet effective, first step towards a multidimensional skin color score. Second, biases were revealed related to skin color in image datasets and computer vision models, previously invisible. The multidimensional skin color scale offers a more representative assessment to surface socially relevant biases due to skin color effects in computer vision. While the present disclosure considers face-related tasks, assessing skin color could also be applied to other human-centric tasks (e.g., pose estimation, segmentation, or the like). This would help to (i) enhance the diversity in the data collection process, by encouraging specifications to better represent skin color variability; and (ii) improve the identification of dataset and model biases in fairness benchmarking, by highlighting their limitations. Therefore, it is recommended for the usage of a multidimensional skin color measure as a fairness tool to assess the computer vision pipeline, from data collection to model deployment.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A computer-implemented method for determining an apparent skin color of a face image, comprising:
   receiving an input image;
   segmenting skin pixels in the input image;
   extracting a perceptual lightness, $L^*$, value, a green-red opponent color value, $a^*$, and a blue-yellow opponent color value in each segmented skin pixel;
   applying a clustering algorithm to cluster the segmented skin pixels;
   computing a histogram of a distribution obtained from the clustering algorithm; and
   assigning a scalar value for $L^*$ and for a hue angle, $h^*$, based on a mode of the histogram, for each cluster.

2. The computer-implemented method of claim 1, further comprising determining a final scalar score for the input image by averaging the scalar values of each cluster, normalized by a pixel size of each cluster.

3. The computer-implemented method of claim 1, further comprising excluding clusters that have an $L^*$ value below a predetermined minimum.

4. The computer-implemented method of claim 1, wherein:
   the clustering algorithm provides five clusters; and
   out of the five clusters, three clusters with the greatest $L^*$ value are retained to compute the $L^*$ and $h^*$ scalar values.

5. The computer-implemented method of claim 1, wherein a number of bins of the histogram is determined by a Sturges formula.

6. The computer-implemented method of claim 1, wherein the segmentation of the skin pixels is performed with a skin segmentation machine learning model.

7. A computer-implemented method for determining bias in a face image dataset, comprising:
   determining an apparent skin color of each face image in the face image dataset by:
      receiving an input image having the face image;
      segmenting skin pixels in the input image;
      extracting a perceptual lightness, $L^*$, value, a green-red opponent color value, $a^*$, and a blue-yellow opponent color value in each segmented skin pixel;

applying a clustering algorithm to cluster the segmented skin pixels;
      computing a histogram of a distribution obtained from the clustering algorithm;
      assigning a scalar value for $L^*$ and for a hue angle, $h^*$, based on a mode of the histogram, for each cluster; and
      determining a final scalar score for the input image by averaging the scalar values of each cluster, normalized by a pixel size of each cluster;
   determining the bias in the face image dataset with respect to light and dark skin tones by calculating a number of face images having the $L^*$ scalar value greater than and less than a first predetermined threshold; and
   determining the bias in the face image dataset with respect to skin hue by calculating a number of face images having the $h^*$ scalar value greater than and less than a second predetermined threshold.

8. The computer-implemented method of claim 7, further comprising excluding clusters that have an $L^*$ value below a predetermined minimum.

9. The computer-implemented method of claim 7, wherein:
   the clustering algorithm provides five clusters; and
   out of the five clusters, three clusters with the greatest $L^*$ value are retained to compute the $L^*$ and $h^*$ scalar values.

10. The computer-implemented method of claim 7, wherein a number of bins of the histogram is determined by a Sturges formula.

11. The computer-implemented method of claim 7, wherein the segmentation of the skin pixels is performed with a skin segmentation machine learning model.

12. The computer-implemented method of claim 7, further comprising:
   generating images with a generative adversarial network and a diffusion model; and
   determining the apparent skin color of each face image in the generated images; and
   determining whether the determined bias is present in the generated images.

13. A computer-implemented method for determining bias in a computer vision-based model, comprising:
   determining an apparent skin color of each face image in the face image dataset by:
      receiving an input image having the face image;
      segmenting skin pixels in the input image;
      extracting a perceptual lightness, $L^*$, value, a green-red opponent color value, $a^*$, and a blue-yellow opponent color value in each segmented skin pixel;
      applying a clustering algorithm to cluster the segmented skin pixels;
      computing a histogram of a distribution obtained from the clustering algorithm;
      assigning a scalar value for $L^*$ and for a hue angle, $h^*$, based on a mode of the histogram, for each cluster; and
      determining a final scalar score for the input image by averaging the scalar values of each cluster, normalized by a pixel size of each cluster;
   using the face image dataset in a machine learning model; and
   determining whether an output of the machine learning model includes a bias based on at least one of the perceptual lightness value or the hue angle value.

14. The computer-implemented method of claim 13, wherein the machine learning model is a face cropping model that selects one face image from a group of two face images, the method further comprising:

measuring a probability of the one face image to be selected by the face cropping model;

comparing the perceptual lightness value and the hue angle value of the two face images; and determining a bias in at least one of the perceptual lightness value or the hue angle value when the face cropping model selects the one face image.

15. The computer-implemented method of claim 13, wherein the machine learning model is a face recognition model that determines whether two face images are from the same person, the method further comprising:

determining a percentage of correct determinations that the face recognition model correctly determine whether the two face images are from the same person; and determining bias between the percentage of correct determines and at least one of the perceptual lightness value or the hue angle value.

16. The computer-implemented method of claim 13, wherein the machine learning model is an attribute prediction model that determines whether the face image includes a selected attribute, the method further comprising:

manipulating the face image dataset by changing a skin tone and a skin hue of each image therein; and observing a causal effect of the manipulating on a performance of correct prediction of the selected attribute with the attribute prediction model.

17. The computer-implemented method of claim 13, further comprising excluding clusters that have an L* value below a predetermined minimum.

18. The computer-implemented method of claim 13, wherein:

the clustering algorithm provides five clusters; and out of the five clusters, three clusters with the greatest L* value are retained to compute the L* and h* scalar values.

*   *   *   *   *